(12) United States Patent
Nakagawa et al.

(10) Patent No.: US 6,862,712 B1
(45) Date of Patent: Mar. 1, 2005

(54) METHOD FOR CONTROLLING DISPLAYED CONTENTS ON A DISPLAY DEVICE

(75) Inventors: Masaki Nakagawa, Fuchu (JP); Shinichi Sawada, Koganei (JP); Tsuyoshi Oguni, Tokyo (JP); Koichiro Hotta, Yokohama (JP)

(73) Assignee: Tokyo University of Agriculture and Technology, Tokyo (JP)

( * ) Notice: Subject to any disclaimer, the term of this patent is extended or adjusted under 35 U.S.C. 154(b) by 0 days.

(21) Appl. No.: 09/400,305

(22) Filed: Sep. 21, 1999

(30) Foreign Application Priority Data

Mar. 8, 1999 (JP) .......................................... 11-059613

(51) Int. Cl.$^7$ ................................................ G06F 3/00
(52) U.S. Cl. ..................................... 715/707; 715/738
(58) Field of Search ............................. 715/707, 737, 715/738; 345/762, 763, 764, 765; 34/113, 114, 151, 152, 181

(56) References Cited

U.S. PATENT DOCUMENTS 5,845,122 A * 12/1998 Nielsen et al. ............... 345/840
6,037,939 A    3/2000 Kashiwagi et al.
6,330,007 B1 * 12/2001 Isreal et al. ................. 345/762

FOREIGN PATENT DOCUMENTS

| JP | 07230374 | 8/1995 |
| JP | 08272783 | 10/1996 |
| JP | 08329264 | 12/1996 |
| JP | 09091114 | 4/1997 |
| JP | 09167248 | 6/1997 |

* cited by examiner

Primary Examiner—Cao (Kevin) Nguyen
(74) Attorney, Agent, or Firm—Stevens, Davis, Miller & Mosher, LLP

(57) ABSTRACT

A method for controlling displayed contents on a display device upon starting an application is adapted that an operator can start the application while confirming the position and aspect size of a new window corresponding to this application by himself. Upon starting an desired application by a calling point, the calling point is dragged from a calling start point in the pull down menu or the pop-up menu to an arbitrary point on the display screen, thereby defining a window of the desired application as a window with diagonal line formed by a line connecting between said calling start point and a calling cancellation point when the calling state is canceled, and this cancellation of the calling state makes said defined window open to start said desired application.

2 Claims, 12 Drawing Sheets

METHOD FOR CONTROLLING DISPLAYED CONTENTS ON A DISPLAY DEVICE

BACKGROUND OF THE INVENTION

1. Field of the Invention

The present invention relates to a method for controlling contents displayed on a screen of a display device which is incorporated in a computer or connected to a computer with an on-line connection, according to changes of contact state and contact coordinates on the display screen (not only contacts by an electronic coordinate input pen but also contacts by a mouse pointer are included).

2. Description of Related Art

As is conventional, when displayed contents on a display screen are controlled to be changed, it is general to adopt following methods which use a graphical user interface (commonly referred to as GUI) as seen in a computer operated with a mouse, a pen computer, a desktop computer in which an electronic pen is used instead of a mouse, or a system in which contents to be displayed are projected from a projector to a large coordinate input tablet such as an electronic whiteboard.

(1) Starting of an Application

In the case of starting an application, a window corresponding to the application is opened to start this application by placing an electronic coordinate input pen (hereinafter, referred to simply as a pen or an electronic pen) or a mouse pointer on one of icons in a pull-down menu or a pop-up menu on the display screen corresponding to the application wanted to be started, and then by double-tapping (double-clicking) the electronic pen or the mouse pointer at this point.

In this case, it is conventional that the window of the application is opened with the same position and aspect size as those when the application was previously used.

This results in that the application window opened as mentioned above frequently covers a window which was now already being opened or exists at a disadvantageous position for the present working environment.

In other words, conventionally, as the new application window is opened at a position and size not commensurate to the present working environment, and moreover as an operator could not forecast the position of the new application window as well as the size thereof, there was a botheration that a next operation could not be started only after the position and size of the novel application window were modified.

(2) Inputting of Characters

In the case of inputting characters by an electronic pen, the characters have to be filled in a blank frame in a document which is under editing or to be written into a dedicated entry frame additionally provided, so that if the characters are written between adjacent frames in transverse and vertical directions, input of the characters was not possible to be received.

This results in that when the new character need to be written between existing characters adjacent in the transverse and vertical directions, after input of the new character it is necessary to reenter the existing characters behind the new character or to newly add a character input frame and reenter therein the existing characters. Therefore, there can not be employed the approach similar to a manual work on a paper in which the new character is directly inserted between the existing adjacent characters or between adjacent character rows, so that not only a merit of pen input cannot be exerted but also the operator sometimes felt burdensome.

(3) Checking in Check Boxes

In the case of checking in check boxes, it is common that each check box is individually switched to an ON/OFF state by placing a electronic pen or a mouse pointer on a desired check item to tap (click) or double-tap (double-click) it.

This results in that even if check items to be changed into ON or OFF are continuous in the vertical direction, the above individual ON/OFF operation for these check items has to be performed with repeating the same operation, and therefor there is a disadvantage in which a plurality of check items are impossible to be switched ON/OFF in a lump.

(4) Selecting of a Selective Radio Button

In the case of selecting a radio button, the desired radio button is selected by placing the electronic pen or the mouse pointer on the corresponding radio button to tap or double-tap it. By the way, when a wrong radio button is selected, a correct radio button has to be selected with same operation, after the selection of the wrong radio button is canceled or without performing this canceling operation.

This additional selecting operation of the correct button by the electronic pen or the mouse pointer imposes a bothersome burden on an operator.

(5) Selecting of a Menu

In the case of selecting a menu, a desired menu item is selected by scrolling up or down the menu until the desired menu item appears on the screen and subsequently by tapping or double-tapping the electronic pen or the mouse pointer on this desired menu item.

As for the selection of a menu, as described above, the menu is needed to keep scrolling up or down until the desired menu item appears on the screen, so that problems in which scroll is overshot and considerable labor is required to select the desired menu item is occurred, particularly, in the case of the menu including multiple menu items.

SUMMARY OF THE INVENTION

It is an object of the present invention, first of all, to dissolve the problems with respect to said botheration in the case of starting an application and to prepare a method for controlling displayed contents on a display device in which, when an application is started, an operator can start the application while confirming the position and aspect size of a new window corresponding to this application by himself.

To this end, according to the present invention, there is provided a method for controlling displayed contents on a display device, upon starting an desired application by selecting it by calling an arbitrary point in a pull-down menu or a pop-up menu on a display screen to open a window of said desired application, characterized in that, said calling point is dragged from a calling start point in the pull-down menu or the pop-up menu to an arbitrary point on the display screen while said calling state is kept, thereby defining said window of the desired application as a window with a diagonal line formed by a line connecting between said calling start point and a calling cancellation point when the calling state is canceled, and this cancellation of the calling state makes said defined window open to start said desired application.

According to the present invention, when desired to start an application, an operator calls an arbitrary point in a pull-down menu or a popup menu on a display screen, and drags the calling point from a calling start point in the pull-down menu or the pop-up menu to an arbitrary point on the display screen, and then cancels the calling state.

This makes it possible to define a window of the application to be opened as a window with a diagonal line formed by a line connecting between said calling start point and a calling cancellation point, and then to open the defined window to be capable of starting the corresponding application.

For this reason, in the method for controlling displayed contents on a display device according to the present invention, upon starting an desired application, an operator can newly open the corresponding window with confirming the position and aspect size thereof by himself.

Accordingly, it is prevented that the window of the application is opened with the same position and aspect size as those when the application was used previously, independent of the intention of the operator, so that the position and aspect size of the window newly opened can be determined by the intention of the operator, Thereby, problems can be resolved in which the new application window covers a window which is now already opened and in which the new window is opened at a disadvantageous position for the present working environment, and therefor, the botheration as occurred in said previous art can be completely dissolved in which a position and magnitude of the new application window have to be modified before a subsequent work is started.

It is another object of the present invention to dissolve the problems with respect to the case of inputting characters in frames and to prepare a method for controlling displayed contents on a display device in which, when characters are input with an electronic pen, even though a new character is written between adjoining frames in transverse or vertical direction, the entry of the new character are received, and further at this time, the new frame for the new character is additionally defined to enable the merit of the pen input to exert sufficiently.

In order to accomplish one of the above-mentioned objects, according to the present invention, there is provided a method for controlling displayed contents on a display device, upon writing characters in frames on a display screen, characterized in that, when a new character is written between adjacent frames in the transverse direction, a new frame is additionally defined between these transversely adjacent frames to display said new character in the new frame and also the subsequent characters are sequentially shifted in the right direction.

According to this aspect of the present invention, upon inputting characters, even though a new character is written between adjacent frames in the transverse direction, input of the new character is able to be performed in the same manner as a manual work of directly inserting the new character between characters on a paper. Moreover, the necessity of reentering the characters behind the new character or newly adding a frame for the new character with manual work and then reentering the characters is eliminated, so that not only a merit of pen input can be exerted but also an occurrence of burdensome for the operator can be avoided.

In order to accomplish the other of the above-mentioned objects, according to the present invention, there is also provided a method for controlling displayed contents on a display device, upon writing characters in frames on a display screen, characterized in that, when a new character is written between adjacent frames in the vertical direction, a new frame array forming an inserting row is additionally defined between these vertically adjacent frames, and said new character is displayed in a frame of the frames in the new additional frame array directly below position in which the new character is written, and also downward character arrays are sequentially shifted downwardly.

According to this aspect of the present invention, upon inputting characters, even though a new character is written between adjacent frames in the vertical direction, input of the new character is able to be performed in the same manner as a manual work of directly inserting the new character between rows on a paper. Moreover, the necessity of reentering the characters behind the new characters or newly adding a frame array for the new character with manual work and then reentering the characters is eliminated, so that not only a merit of pen input can be exerted but also an occurrence of burdensome for the operator can be avoided.

It is further object of the present invention to dissolve the problems with respect to the case of checking in check boxes and to prepare a method for controlling displayed contents on a display device in which, when check items are continuous in the vertical direction and a plurality of items to be checked or unchecked are succeeding, these items can be collectively switched ON/OFF.

To this end, according to the present invention, there is provided a method for controlling displayed contents on a display device, upon checking or unchecking in check boxes which are continuously arranged together with their check items in the vertical direction, characterized in that, when a calling point is made to pass in the vertical direction on a display screen in order to pass through desired, continuous check items of said check items, these desired, continuous check items are selected, and subsequently when the calling point is further shifted in one direction of the transverse direction on the display screen, the selected items are checked, and when the calling point is shifted in the other direction of the transverse direction on the display screen, the selected items are unchecked.

According to this aspect of the present invention, upon entering or removing checks in check boxes which are continuously arranged together with their check items in the vertical direction, if the check items to be checked or unchecked are continuous in the vertical direction, these continuous check items can be selected by passing a calling point in the vertical direction on a display screen in order to pass through all of the continuous check items, and subsequently, these selected items can be checked by further shifting the calling point in one direction of the transverse direction on the display screen, and the selected items can be unchecked by further shifting the calling point in the other direction of the transverse direction on the display screen.

This makes it possible that if the check items to be checked or unchecked are continuous in the vertical direction, these check items can be switched ON/OFF in a lump without repeating the same operation of individually switching each check box to ON/OFF state, so that the checking work to the check boxes can be performed efficiently.

It is further object of the present invention to dissolve the problems with respect to the case of selecting a radio button and to prepare a method for controlling displayed contents on a display device in which, when a radio button selected is wrong, a correct radio button can be selected by a drag operation of the electronic pen or the mouse pointer, so that a bothersome operation in which the correct radio button has to be selected from the first once again is eliminated.

To this end, according to the present invention, there is provided a method for controlling displayed contents on a display device, upon selecting one of a plurality of selective radio buttons on a display screen by a calling point, characterized in that, even though one of said plurality of selective radio buttons has been selected by the calling point, when the calling point is shifted, a radio button directed by the calling point placed in the shifted position is alternatively selected, and the selection of a radio button which has been selected when the calling status by the calling point is finally canceled is established.

According to this aspect of the present invention, upon selecting one of a plurality of selective radio buttons, even if the radio button selected by a calling point is wrong, the correct radio button can be selected by dragging the calling point under calling state and also the selection can be established by canceling the calling operation of the calling point.

This makes it possible that the bother can be dissolved in which the correct radio button has to be selected again from the first by a further calling operation after the calling operation is canceled when the radio button selected is found to be wrong.

It is another object of the present invention to prepare a method for controlling displayed contents on a display device in which, upon selecting one of a plurality of radio buttons, even if an electronic pen or a mouse pointer exceeds uppermost or lowermost side of the radio buttons, selection of a radio button can be established to improve the selective operation performance of the radio buttons.

To this end, according to the present invention, there is provided a method for controlling displayed contents on a display device, upon selecting one of a plurality of selective radio buttons as set forth, characterized in that, when said calling point exceeds an uppermost side of the selective radio buttons, the uppermost radio button is selected, and when exceeding a lowermost side of the selective radio buttons, the lowermost radio button is selected.

According to this aspect of the present invention, even if the calling point exceeds the uppermost or lowermost side of the radio buttons, selection of the reasonable button can be established to improve the selective operation performance of the radio buttons.

It is another object of the present invention to dissolve the problems with respect to the case of selecting a menu and to prepare a method for controlling displayed contents on a display device in which, upon selecting one of a plurality of menu items, the necessity of scrolling the menus upwardly or downwardly is eliminated or at least a small amount of scrolling is required.

To this end, according to the present invention, there is provided a method for controlling displayed contents on a display device, upon selecting one of menus continuous in the vertical direction on a display screen by a calling point, characterized in that, when the calling point is deviated in the transverse direction from a scroll area of said menus, the menus in the scroll area are displayed with reduction scale in order to increase the number of displayed menus, and in this condition, when the calling point is shifted in the vertical direction, one of the menus in the scroll area which stand in row with the calling point is selected, and thereafter, when the calling point is made to get back within said scroll area, the menus in the scroll area is displayed with original scale so as to display said selected menu in the scroll area.

According to this aspect of the present invention, upon selecting one of menus continuously arranged in the vertical direction by a calling point, the necessity of scrolling up or down the menus can be eliminated or, even if the menus is scrolled in the vertical direction, the amount of scrolling until a desired menu item appears on a display screen can be reduced.

This makes it possible to prevent the overshoot of scrolling even if the number of menu items is large, and thus the selection of the menu items can be performed simply, surely, and in a short period of time.

Figure 1:
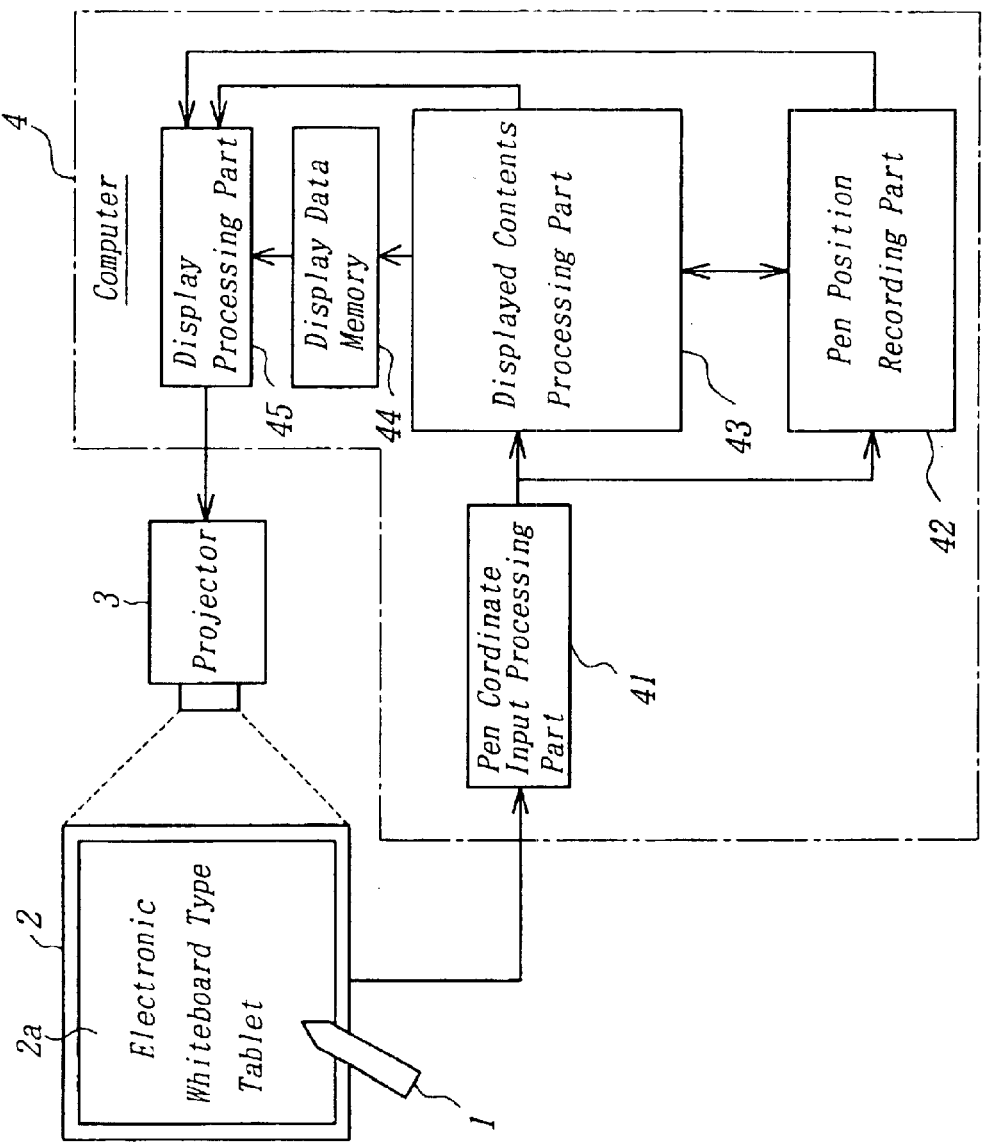
FIG. 1 is a block diagram of a system showing an interactive electronic whiteboard system as one example of a display device used for executing the method for controlling displayed contents according to one embodiment of the present invention.
Figure 2A:
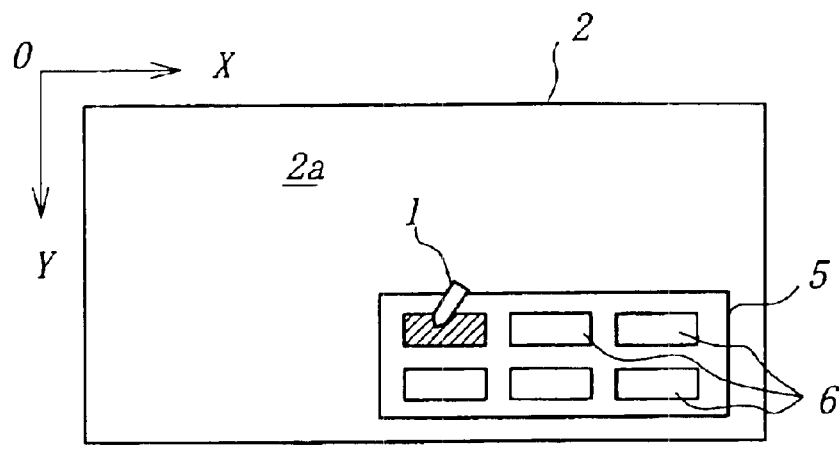
FIG. 2 shows a window opening procedure when an application is started with the method according to the embodiment of the present invention.
Figure 2B:
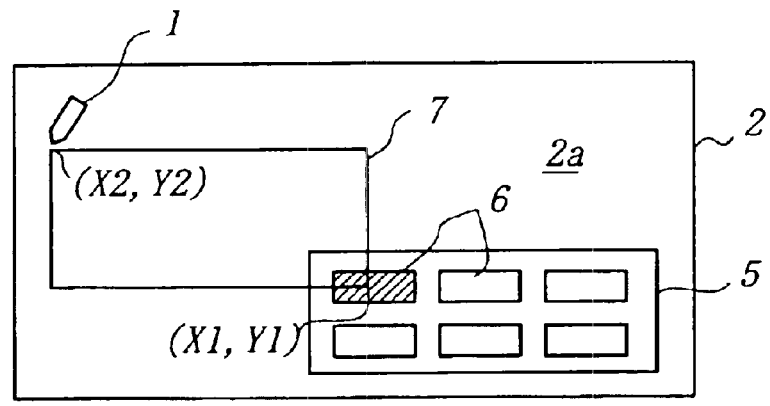
Figure 2C:
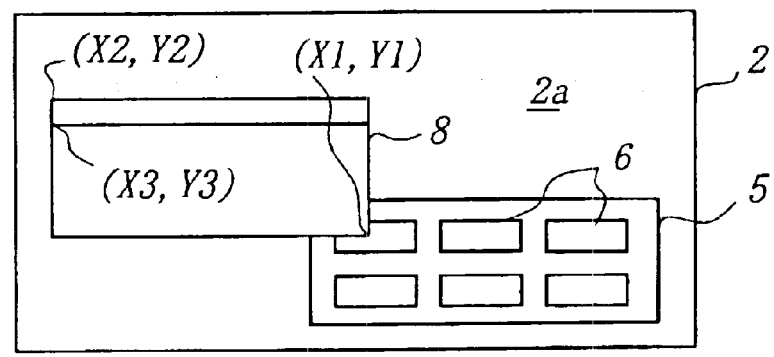
Figure 3:
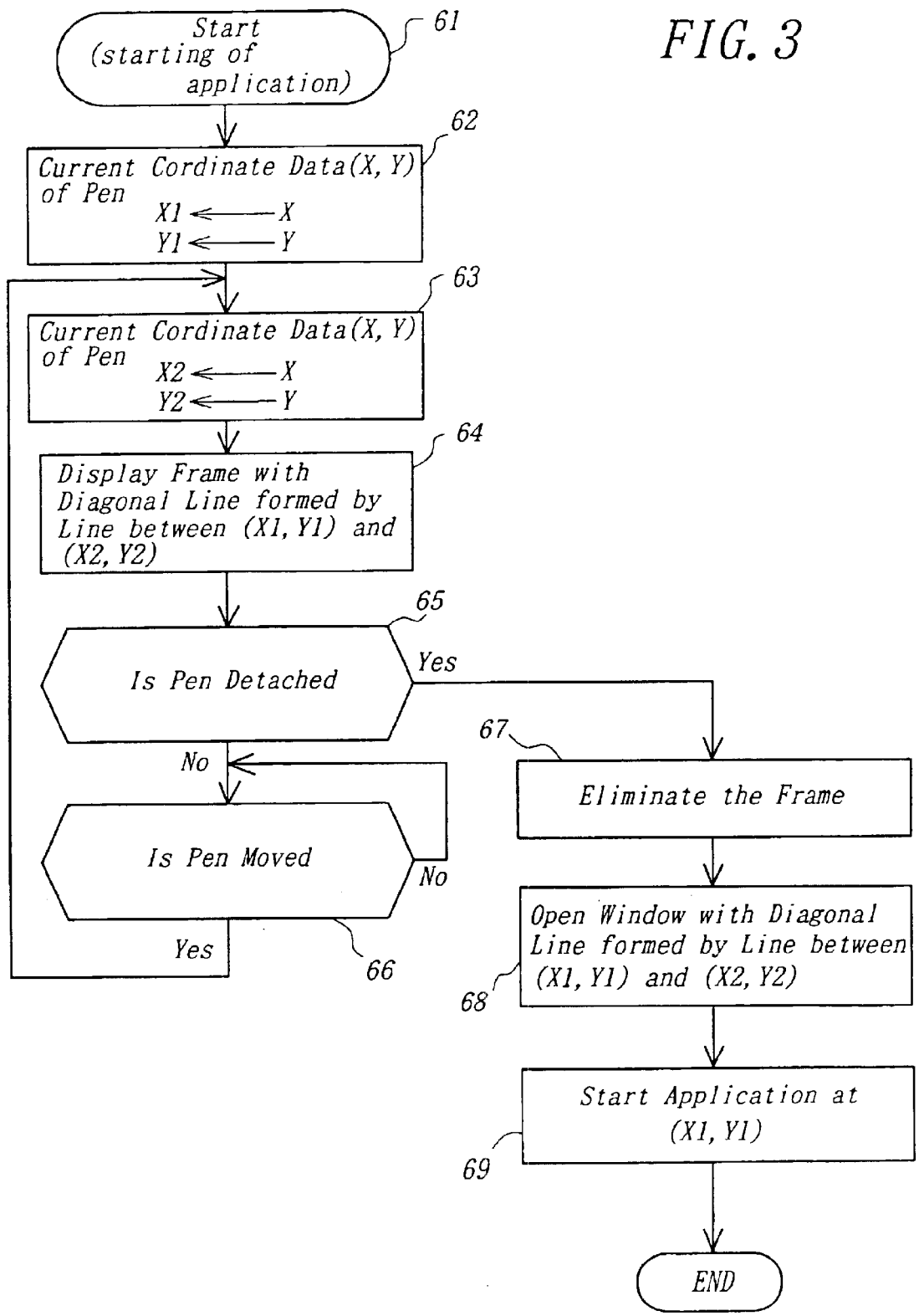
Figure 4A:
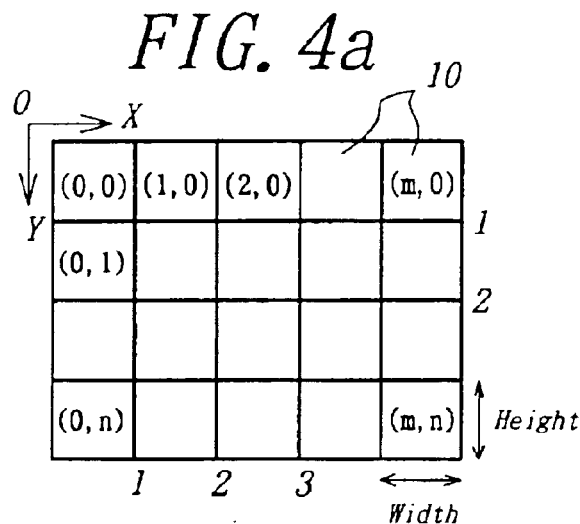
Figure 4B:
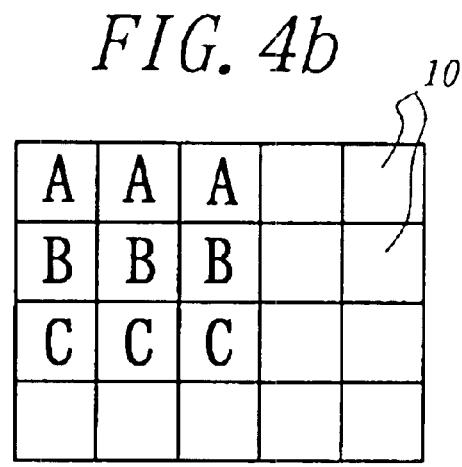
Figure 4C:
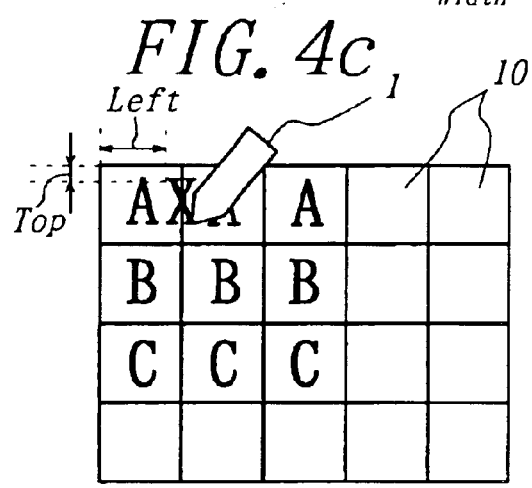
Figure 4D:
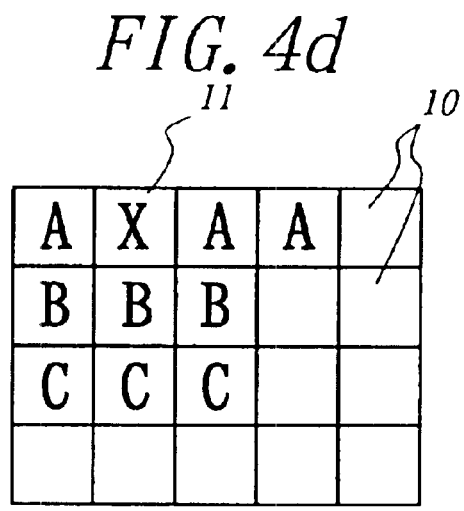
Figure 4E:
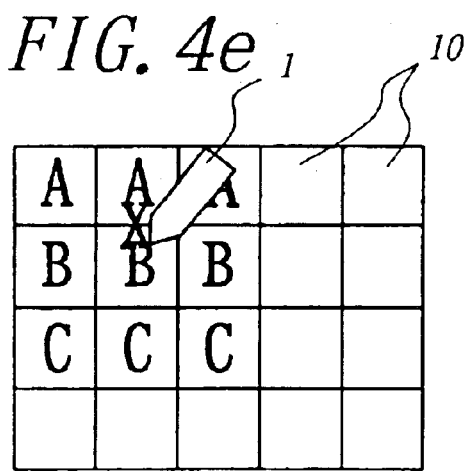
Figure 4F:
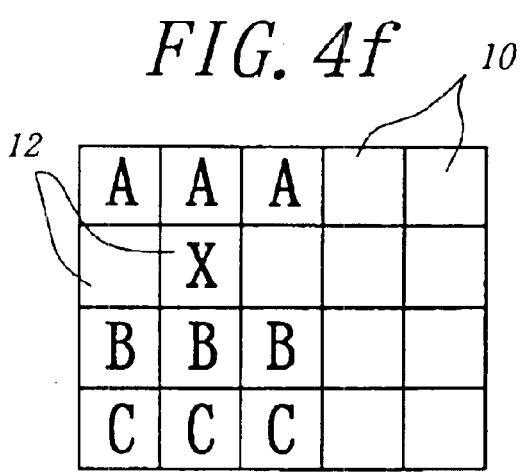
Figure 5:
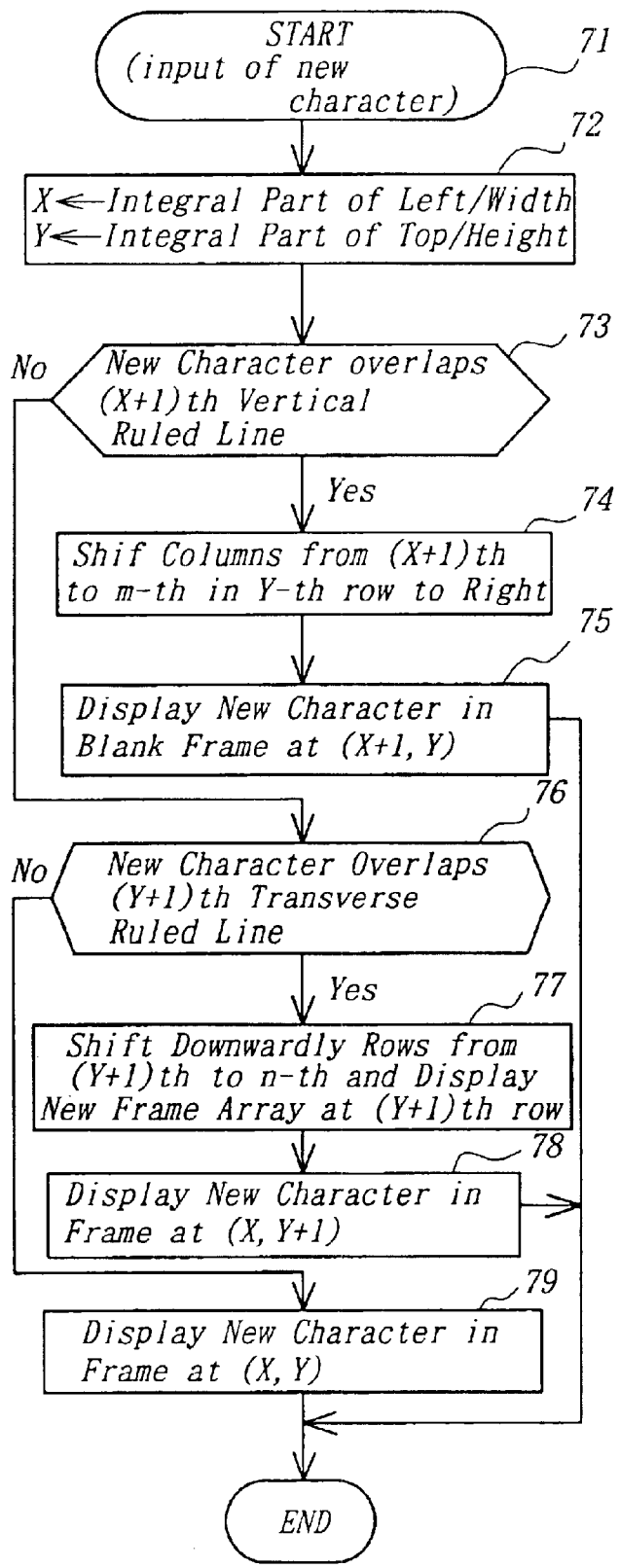
Figure 6A:
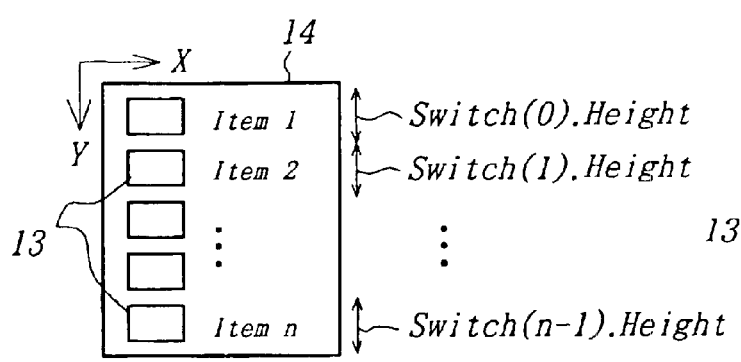
Figure 6B:
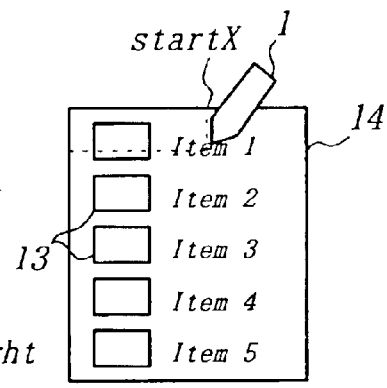
Figure 6C:
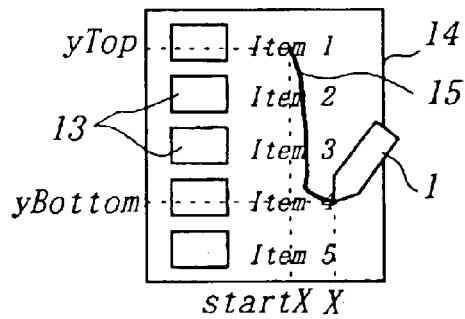
Figure 6D:
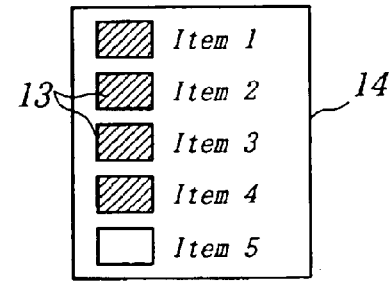
Figure 7:
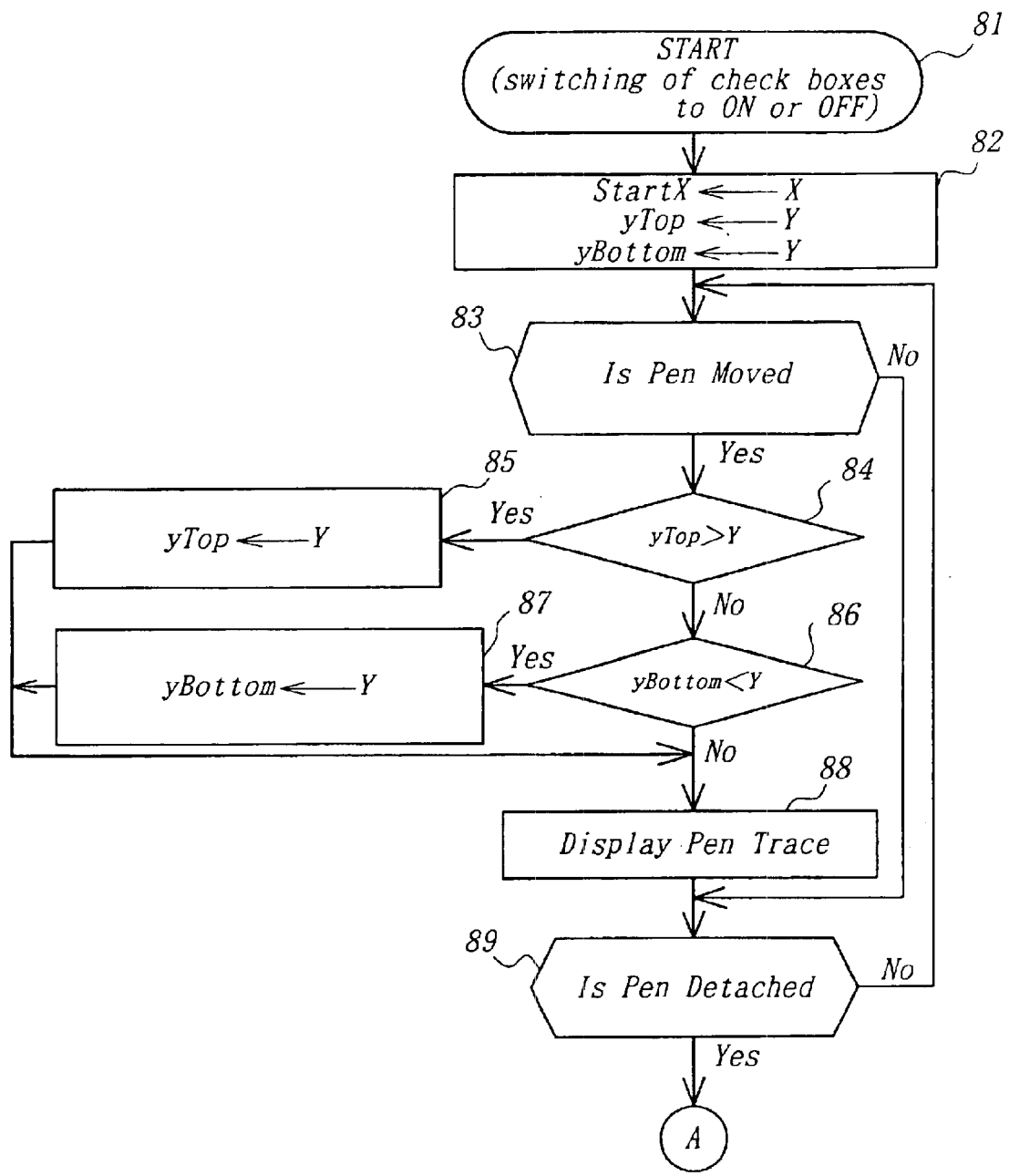
Figure 8:
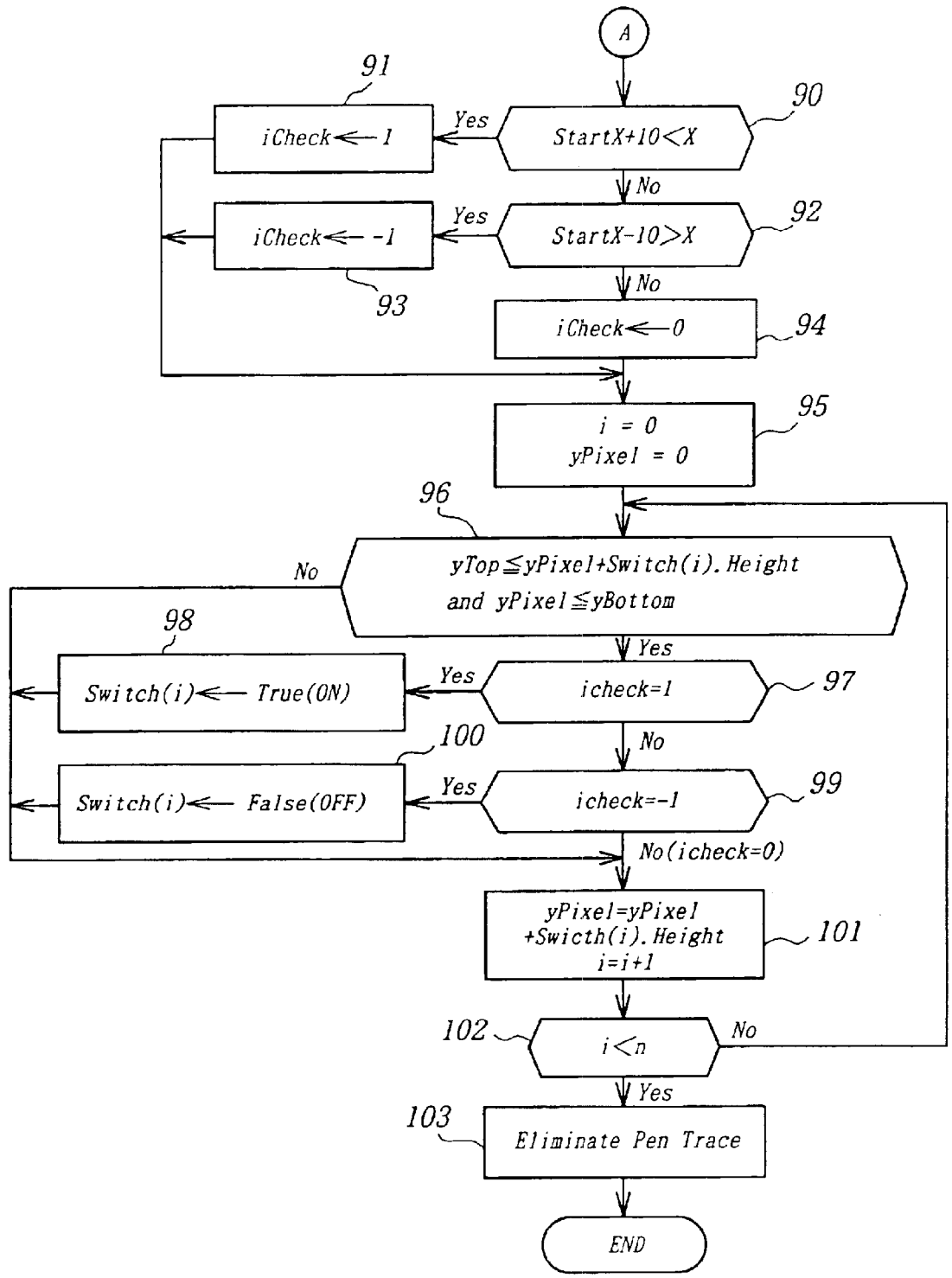
Figure 9:
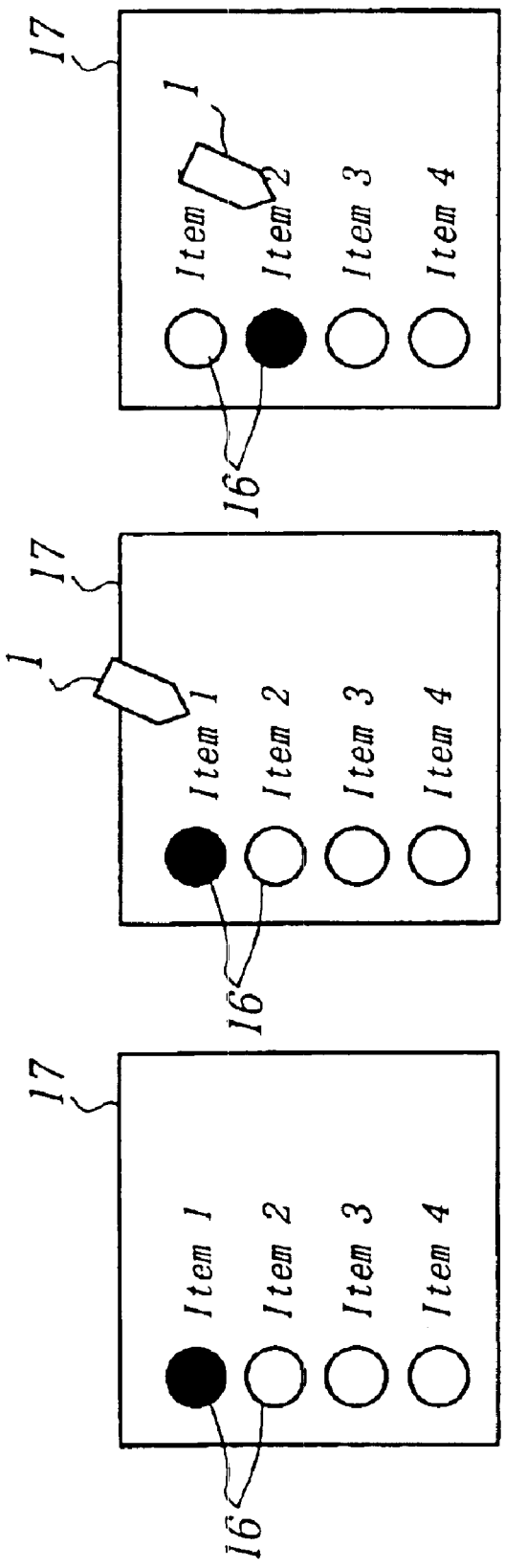
Figure 10:
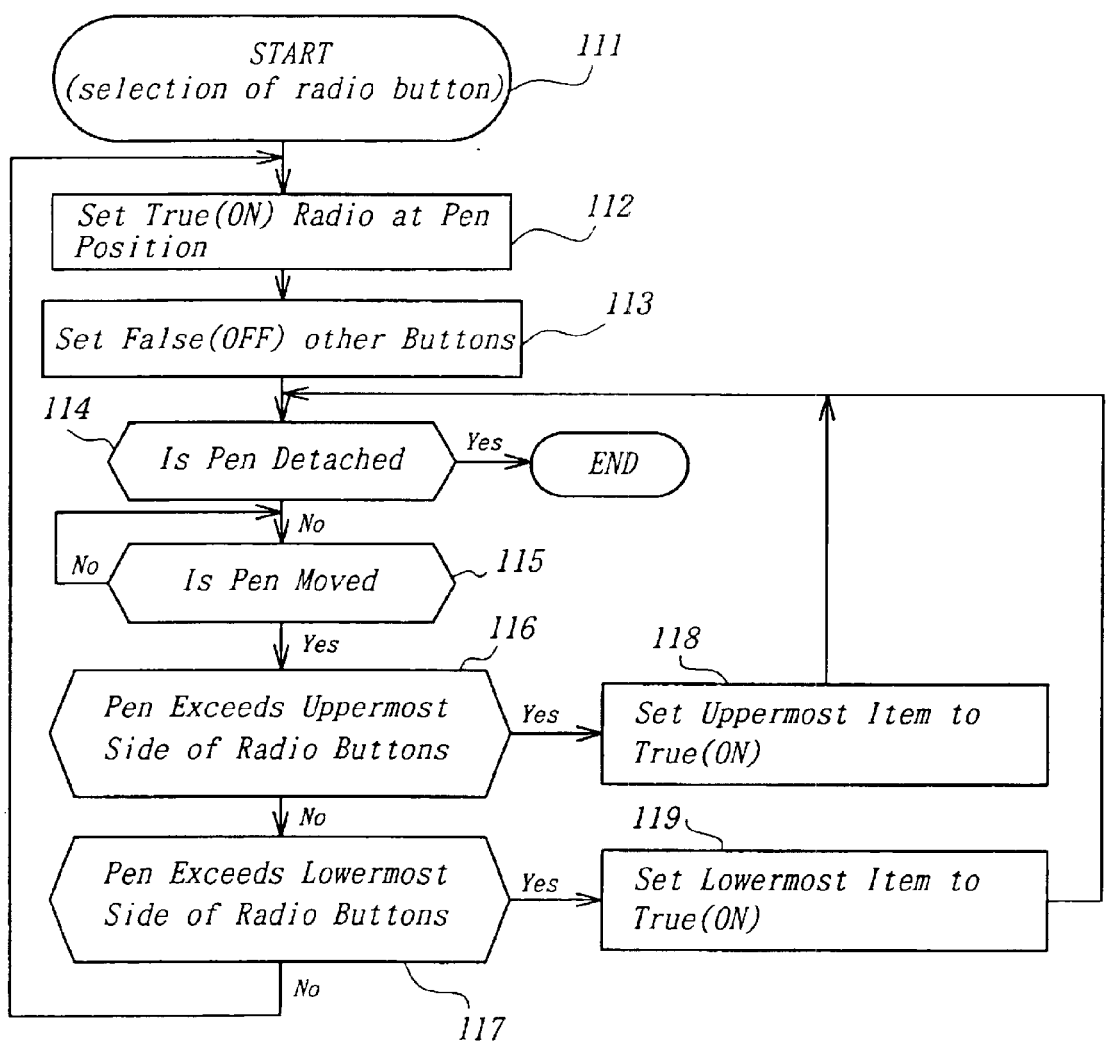
Figure 11A:
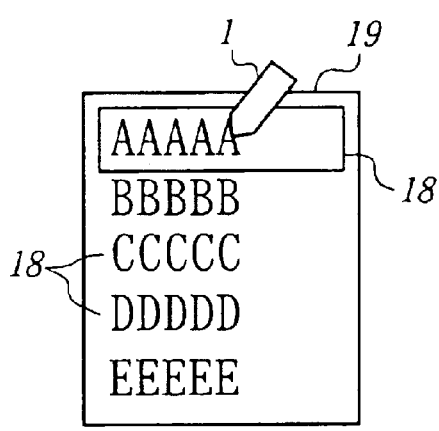
Figure 11B:
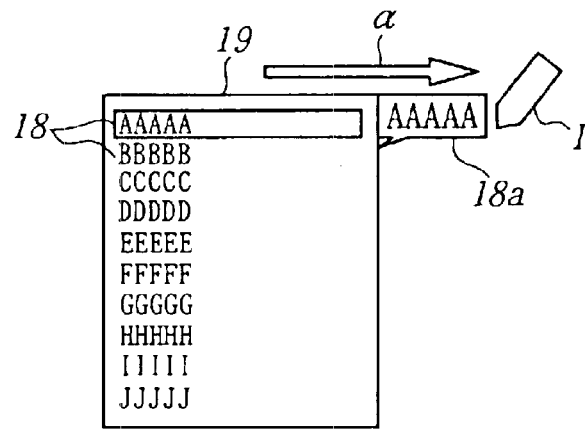
Figure 11C:
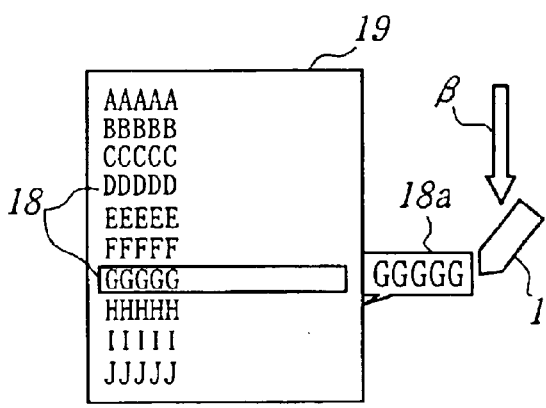
Figure 11D:
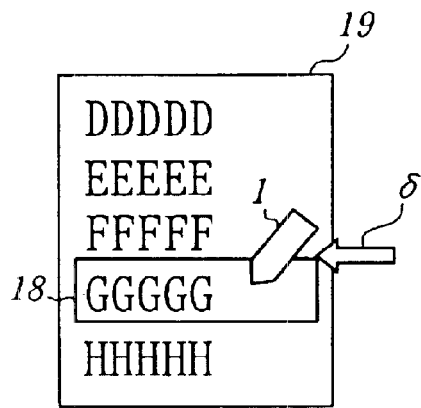
Figure 12:
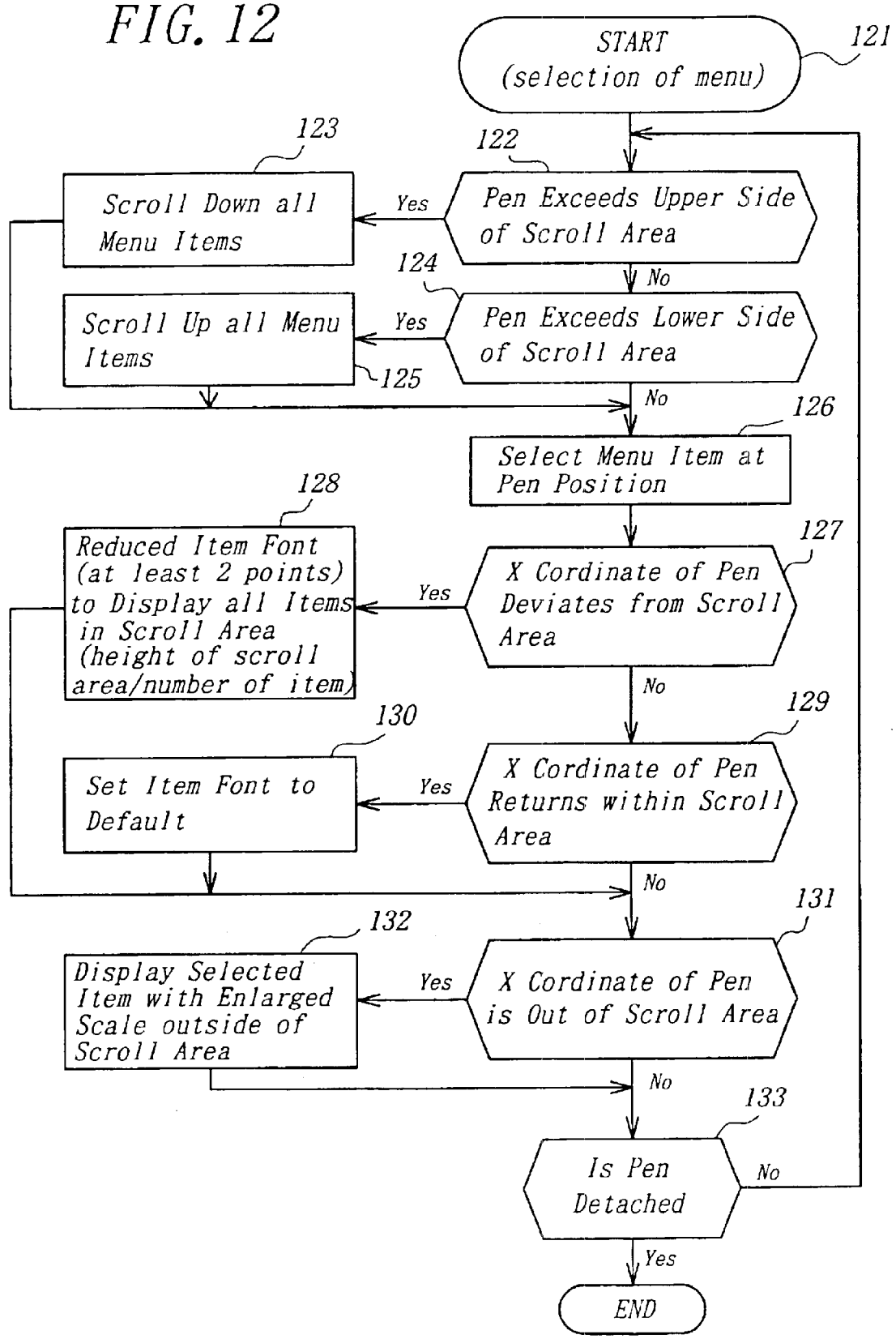

(a) is an illustration showing a step of selecting an application;

(b) is an illustration showing a decision step of a window position and a window aspect size; and (c) is an illustration showing a window opening step;

FIG. 3 is a flow chart showing a control program in which the computer in the electronic whiteboard system of FIG. 1 starts the application as shown in FIG. 2;

FIG. 4 shows a character insertion procedure when a new character is inserted and displayed with the method according to the embodiment of the present invention;

(a) is an illustration showing only a character entry frames;

(b) is an illustration showing a state of these frames in which some characters have already been entered;

(c) is an illustration showing a state immediately after a new character is written on a vertical ruled line between adjacent frames in transverse direction;

(d) is an illustration showing the new character insertion state after the new character is written on the vertical ruled line;

(e) is an illustration showing a state immediately after a new character is written on a transverse ruled line between adjacent frames in vertical direction; and (f) is an illustration showing the new character insertion state after the new character is written on the transverse ruled line;

FIG. 5 is a flow chart showing a control program in which the computer in the electronic whiteboard system of FIG. 1 inserts and displays the new character as shown in FIG. 4;

FIG. 6 shows a procedure when check boxes are checked with the method according to the embodiment of the present invention;

(a) is an illustration showing only a check group in which check items are listed up;

(b) is an illustration showing a state in which a pen is made into contact with a first item in this check group;

(c) is an illustration showing a state when the pen is shifted so as to intersect a plurality of objective items; and (d) is an illustration showing a state when the pen is released from the display screen to switch a plurality of objective items to ON in a lump;

FIG. 7 is a flow chart showing a front half of a control program in which the computer in the electronic whiteboard system of FIG. 1 checks the check boxes as shown in FIG. 6;

FIG. 8 is a flow chart showing a latter half of the control program subsequent to the control program of FIG. 7;

FIG. 9 shows a procedure when radio buttons are selected with the method according to the embodiment of the present invention;

(a) is an illustration showing a state in which a first item has already been selected;

(b) is an illustration showing a state in which the first item has incorrectly been selected although a second item must be selected; and (c) is an illustration showing a state when the wrong selection described above is noticed and the pen is shifted to the second item with keeping the pen in the contact state;

FIG. 10 is a flow chart showing a control program in which the computer in the electronic whiteboard system of FIG. 1 selects the radio button as shown in FIG. 9;

FIG. 11 shows a procedure when one of menu items are selected with the method according to the embodiment of the present invention;

(a) is an illustration showing a state immediately after the pen is made into contact with the uppermost menu item in a scroll area to select this menu item;

(b) is an illustration showing a state when the pen is shifted in the transverse direction from the position of (a) to a position outside of the scroll area;

(c) is an illustration showing a state when the pen is shifted in the vertical direction from the position of (b) while outside of the scroll area to select another menu item; and (d) is an illustration showing a state when the pen is returned within the scroll area in the transverse direction after another item has been selected; and FIG. 12 is a flow chart showing a control program in which the computer in the electronic whiteboard system of FIG. 1 selects a menu as shown in FIG. 11.

DESCRIPTION OF THE PREFERRED EMBODIMENTS

The embodiments of the present invention will be described more fully hereinafter with reference to the accompanying drawings.

FIG. 1 is a block diagram of a system showing an interactive electronic whiteboard system as a example of a display device used for executing the method for controlling displayed contents according to one preferred embodiment of the present invention.

The electronic whiteboard system as shown is composed of, as main components, an electronic whiteboard type tablet 2 (hereinafter referred to as an electronic whiteboard) which acts to detect a contact state of an electronic pen 1 to a display screen 2a, a coordinate of a contact point (in the present specification, also referred to as a contact coordinate, a pen coordinate or a calling point), and deviation of the calling point, a projector 3 projecting and displaying a data such as a document on this electronic whiteboard 2, and a computer 4 transmitting a display data to the projector 3.

The computer 4 is provided with a pen coordinate input processing part 41 receiving a contact coordinate from the electronic whiteboard 2 and a pen position recording part 42 storing the present position of the pen 1 as well as a moved position thereof.

The computer 4 is further provided with a displayed contents processing part 43 performing a window control for starting applications, an insertion control for characters/rows, an ON/OFF control for check boxes, a selection control for selective radio buttons, and magnifying/reducing/scrolling control of menu items, all of which control appears on the electronic whiteboard 2, as will hereinafter be described in more detail, a display data memory 44 storing display data such as a document, and a display processing part 45 processing display data for the projector 3.

Incidentally, the electronic whiteboard type tablet 2 in the present embodiment is type of detecting the contact point and the contact coordinate (calling point) of the pen 1 according to, for example, a degree of electromagnetic coupling with the pen 1, however alternatively, a known tablet of the other type may also be used in which the existence of contact and the contact coordinate of the pen 1 are detected by a pressure sensitive type, a capacitance sensitive type, or the like.

Now, the method for controlling displayed contents on the present embodiment will be explained with reference to FIGS. 2 and 3 in which there is started one of applications registered as a plurality of buttons or icons 6 in a pop-up menu 5 displayed on a display screen 2a (whiteboard surface) of the electronic whiteboard 2 as shown in FIG. 2(a) by the projector 3 in the above-mentioned electronic whiteboard system.

When an operator intends to start an application corresponding to, for example, the leftmost icon in an upper row of a plurality of icons 6 in a pop-up menu 5 in FIG. 2, firstly, as shown in FIG. 2(a), the operator makes the pen 1 to contact the icon 6 to make here a calling start point. This causes the application corresponding to the icon 6 with which the pen 1 was made contact to be selected.

Next, as shown in FIG. 2(b), when the operator drags the pen 1 from the calling start point (X1, Y1) described above to an arbitrary point (X2, Y2) while keeping the contact state, a frame 7 with a diagonal line formed by a line connecting between these two points is displayed on the display screen of the electronic whiteboard 2.

Then, as shown in FIG. 2(c), when the operator detaches the pen 1 away from the display screen 2a of the electronic whiteboard 2 to cancel the calling state, a window 8 of the selected application is opened with the same aspect size and at the same position as those of the above-mentioned frame 7 with the diagonal line formed by the line connecting the calling start point (X1, Y1) by the pen 1 and the calling cancellation point (X2, Y2) on the display screen 2a of the electronic whiteboard 2, whereby the selected application is started.

At this time, if the calling cancellation point is changed from the previous point (X2, Y2) to, for example, to the point (X3, Y3) as shown in FIG. 2(c), the application window 8 can make the aspect size and the position to be changed, so that, when starting the application, the operator can arbitrarily decide the size, figuration, and position of the corresponding window 8 at starting time of the application.

FIG. 3 shows a control program in which the displayed contents processing part 43 in FIG. 1 executes the starting of the application as described above. This program is started at step 61 when some button or icon 6 is pressed by the pen 1, as shown in FIG. 2(a), to select the application corresponding to the calling start point (X1, Y1).

First of all, at step 62, a coordinate data (X, Y) of the pen 1 at the starting time of the control program is stored as a calling start point (X1, Y1), at step 63, the subsequent coordinate data (X, Y) of the pen 1 keeps to update a calling cancellation point (X2, Y2), and at step 64, a rectangular frame 7 with a diagonal line formed by a line connecting between the calling start point (X1, Y1) and the calling cancellation point (X2, Y2) is displayed on the display screen 2a of the electronic whiteboard 2, as shown in FIG. 2(b).

At the next step 65, it is judged whether the pen 1 is detached apart from the display screen 2a or not, and until the pen 1 is detached, at step 66, it is judged whether the pen 1 is being moved or not.

While the pen 1 is in contact with the display screen 2a but is not moved, the control is returned to step 66, so that the above-mentioned processing at steps 63, 64 are not executed, therefore, update of the calling cancellation point (X2, Y2) and modification of the rectangular frame 7 on the display screen 2a are not performed.

However, when the pen 1 is moved in contact with the display screen 2a, the control is returned to steps 63, 64 to execute the processing at these steps, so that the calling cancellation point (X2, Y2) is updated one after another and also the rectangular frame 7 on the display screen 2a is modified accordingly.

When the pen 1 is judged at step 65 to be detached apart from the display screen 2a, the control continues to steps 67 to 69, at step 67, the control eliminates the rectangular frame 7 displayed on the display screen 2a described above, at step 68, it opens an application window 8 with the same aspect size and position as those of the rectangular frame 7 with a diagonal line formed by a line connecting the calling start point (X1, Y1) and the calling cancellation point (X2, Y2) on the display screen 2a of the electronic whiteboard 2, as shown in FIG. 2(c), and at step 69, it makes the application corresponding to the button or icon 6 at the calling start point (X1, Y1) to start.

Incidentally, when the application window 8 is opened on the display screen 2a of the electronic whiteboard 2, an application can also be started of which a window has a diagonal line formed by a line having such a length that multiplies the length from the calling start point (X1, Y1) to the calling cancellation point (X2, Y2) by k, that is, a diagonal line formed by a line connecting the calling start point (X1, Y1) and a k-times coordinate point designated by {(X1+k (X2−X1), (Y1+k (Y2−Y1))}.

According to the method for controlling displayed contents based on the present embodiment, when starting an application, an operator can start the application while confirming the position and aspect size of a new window by the above-mentioned rectangular frame 7 by himself.

Accordingly, it is prevented that the window of the application is opened with the same position and aspect size as those when the application was used previously, independent of the intention of the operator, so that the position and aspect size of a window 8 newly opened can be determined by the intention of the operator, whereby problems can be canceled in which the new application window covers a window which has been already opened or the new application window is opened at a disadvantageous position for the present working environment, and the botheration can be completely dissolved in which a position and magnitude of a new application window have to be modified before a subsequent work is started.

FIG. 4(a) shows a character input frames 10 of (m×n) partitioned by vertical and transverse ruled lines and displayed by the projector 3 on the display screen 2a of the electronic whiteboard 2 in the electronic whiteboard system shown in FIG. 1, and FIG. 4(b) shows the character input frames 10 in some of which frames characters of "A", "B", and "C" have been already entered.

Now, with respect to the case of writing a new character "X" so as to overlap the ruled line between the character input frames 10 as shown in FIGS. 4(c) and 4(e), the method for controlling displayed contents according to the present embodiment will be described with reference to FIGS. 4 and 5.

When the new character "X" is written between the frames 10 adjacent in the transverse direction, that is, so as to overlap the vertical ruled line, as shown in FIG. 4(c), a frame 11 for the new character is newly defined between these transversely adjacent frames, as shown in FIG. 4(d), and the new character "X" is displayed within this new additional frame 11 and also the subsequent characters are shifted sequentially in the right direction.

When the new character "X" is written between frames 10 adjacent in the vertical direction as shown in FIG. 4(e), a new frame array 12 is defined between these vertically adjacent frames to form an character inserting row as shown in FIG. 4(f), and the new character is displayed in the frame of the frames in the newly defined frame array directly below position in which the new character "X" is written, and also the downward character arrays are sequentially shifted downwardly.

When the new character "X" is written so as not to overlap a ruled line between frames 10, as is conventional, the new character is displayed within the corresponding frame 10.

FIG. 5 shows a control program in which the displayed contents processing part 43 in FIG. 1 executes the character/ row insertion processing as described above. This program is started at step 71 when a character is written by the pen 1 in an area of character input frames 10 shown in FIG. 4(a).

First of all, at step 72, With using the coordinate data (Left, Top) in upper left of the written new character "X" shown in FIG. 4(c) and Width and Height of the character input frame 10 shown in FIG. 4(a), the integral part of Left/Width is substituted into X and the integral part of Top/Height is substituted into Y.

At step 73, it is judged whether or not the written new character "X" overlaps the (X+1)th vertical ruled line as shown in FIG. 4(c). If it is overlapped, at step 74, columns from (X+1)th column to m-th column in Y-th row, that is, characters in the right side from the (X+1)th ruled line are sequentially shifted to the right, as shown in FIG. 4(d), and further, at step 75, the newly written character "X" is displayed in the blank frame 11 at (X+1, Y).

At step 73, if the newly written character "X" is judged not to overlap the (X+1)th vertical ruled line, at step 76, it is judged whether or not the newly written character "X" overlaps the (Y+1)th transverse ruled line, as shown in FIG. 4(e).

If it is overlapped, at step 77, a blank frame array 12 is newly defined at (Y+1)th row, as well as sequentially shifting downwardly rows from (Y+1)th row to n-th row, that is, rows downward from the (Y+1)th ruled line, as shown in FIG. 4(f), and further, at step 78, the new character "X" is displayed within the frame at (X, Y+1) directly below position in which the new character "X" is written.

If, at steps 73, 76, the newly written character "X" is judged not to overlap vertical and transverse ruled lines, at step 79, "X" is displayed in the frame 10 at (X, Y) in the position in which the new character "X" is written.

Accordingly, in the method for controlling displayed contents according to the present embodiment, upon input of a new character, even if the new character is written between adjacent frames in the transverse direction, input of the new character can be performed in the same manner as a manual work of directly inserting the new character between characters as is executed on a paper. Moreover, the necessity of reentering the characters behind the new character or newly adding a frame for the new character with manual work and then reentering the characters is eliminated, so that not only a merit of pen input can be exerted but also an occurrence of burdensome for the operator can be avoided.

In addition, upon input of a new character, even if the new character is written between adjacent frames in the vertical direction, input of the new character can be performed in the same manner as a manual work of directly inserting the new character between vertically adjacent rows as is executed on a paper. Moreover, the necessity of reentering the characters behind the new character or newly adding a frame array for the new character with manual work and then reentering the characters is eliminated, so that not only a merit of pen input can be exerted but also an occurrence of burdensome for the operator can be avoided.

FIG. 6(a) shows a check group 14 which is displayed by the projector 3 on the display screen 2a of the electronic whiteboard 2 in the electronic whiteboard system shown in FIG. 1, and in which check boxes 13 with respect to each of items 1 to n exist continuously in the vertical direction on the display screen 2a.

Now, with respect to the case of entering checks in the continuous items 1 to 4 as shown in FIG. 6(d), the method for controlling displayed contents according to the present embodiment will be described with reference to FIGS. 6 to 8.

Upon this checking, first of all, as shown in FIG. 6(b) the operator makes the pen 1 to contact the display screen 2a at a position in which the uppermost item (item 1) of items (items 1 to 4) to be checked (ON) is placed.

Thereafter, the operator moves the pen 1 downwardly so as to intersect the items (items 1 to 4) to be checked (ON) as shown in FIG. 6(c), while keeping the contact with the display screen 2a, and then the operator, when the pen 1 reaches the lowermost item (item 4) to be checked (ON), moves the pen 1 to the right direction and detaches away the pen 1 from the display screen 2a.

At this time, as shown in FIG. 6(d), the check boxes of the continuous and desired items 1 to 4 are switched ON in a lump.

Incidentally, to the contrary, when the pen 1, after reached the position of the lowermost item (item 4), is moved in the left direction and detached away from the display screen 2a, the checks of the items 1 to 4 are removed to be switched OFF.

FIGS. 7 and 8 show a control program in which the displayed contents processing part 43 in FIG. 1 executes the switching of the check boxes 13 to ON or OFF as described above. This program is started at step 81 when the pen 1 is pressed on the area of the check group 14 shown in FIG. 6.

First of all, at step 82 of FIG. 7, X of pen coordinate (X, Y) when the program is just started, that is, when the pen 1 is firstly made contact with the check group 14 is stored as startX which is the X coordinate of the calling start point shown in FIG. 6(b), Y of the above pen coordinate (X, Y) is stored as yTop and yBottom which represents the uppermost and lowermost positions of pen moving trace in the vertical direction respectively as shown in FIG. 6(c).

At step 83, it is judged whether or not the pen 1 is moved. While the pen 1 is being moved, if Y of the current pen coordinate (X, Y) is judged to be smaller than yTop at step 83, Y is stored as yTop to update it at step 85. If Y of the current pen coordinate (X, Y) is judged to be beyond yBottom at step 86, Y is stored as yBottom to update it at step 87.

However, if Y of the current pen coordinate is judged to be equal to yTop or more at step 84 and also if Y of the current pen coordinate is judged to be not more than yBottom at step 86, steps 85 and 87 are not executed, so that yTop and yBottom are not updated.

After yTop and yBottom are updated properly in this manner, the control continues to step 88, a trace 15 of the pen 1 is displayed as shown in FIG. 6(c), to make the operator to recognize how moved the pen 1.

As will be appreciated from the explanation described above, yTop and yBottom designate Y coordinates in the uppermost point and lowermost point of the trace 15 of the pen 1, respectively.

At step 89, it is judged whether or not the pen 1 is detached away from the display screen, and, until the pen 1 is detached, a loop including steps 83 to 88 is repeated to continue updating Y coordinate yTop in the uppermost point and Y coordinate yBottom in the lowermost point of the pen trace 15.

If the pen 1 is judged to be detached away from the display screen at step 89, the control continues to step 90 and subsequent steps shown in FIG. 8.

At step 90, it is judged whether or not the pen 1 is shifted to the right by checking whether or not X of the current pen coordinate (X, Y) exceeds a value obtained by adding 10 to X coordinate startX of said calling start point. If the pen 1 is judged to be shifted to the right, at step 91, iCheck is set to 1 in order to indicate this shift of the pen 1.

At step 92, it is judged whether or not the pen 1 is shifted to the left by checking whether or not X of the current pen coordinate (X, Y) is smaller than a value obtained by subtracting 10 from X coordinate startX of said calling start point. If the pen 1 is judged to be shifted to the left, at step 98, iCheck is set to −1 in order to indicate this shift of the pen 1.

When the pen 1 is judged at steps 90, 92 that it is shifted to neither right nor left direction, at step 94, iCheck is set to 0 in order to indicate this.

Thereafter, the control proceeds to steps 95 to 102, and in these steps, it is judged which check items exist between the uppermost point Y coordinate yTop and the lowermost point Y coordinate yBottom of the pen trace 15, that is, the range of the continuous check items in which the pen 1 has intersected is judged, and then, it is judged whether the check items intersected have to be switched ON or OFF.

To this end, first of all, at step 95, a counter i[0−(n−1)] of Switches defined as in FIG. 6(a) for each check item is reset to 0, and also a pixel number yPixel in the Y coordinate direction is reset to 0.

At next step 96, if height of each check item Switch(i) is assumed to be Switch(i).Height, as shown in FIG. 6(a), it is judged whether or not yPixel+Switch(i).Height is equal to the uppermost point Y coordinate yTop of the pen trace 15 or more and yPixel is equal to the lowermost point Y coordinate yBottom of the pen trace 15 or less. If in the case of Yes, when iCheck is judged at step 97 to be 1, Switch(i) is made True at step 98 to set the corresponding check item to ON, when iCheck is judged at step 99 to be −1, Switch(i) is made False at step 100 to set the corresponding check item to OFF, and when iCheck is judged at steps 97 and 99 to be 0, steps 98 and 100 are skipped to keep Switch(i) in the current state.

At step 101, yPixel is updated to [yPixel+Switch (i).Height] and also counter i of Switch is increased by one.

At step 102, whether or not counter i of the Switch is judged to be less than the number n of check items, if in the case of Yes, the above-mentioned loop including steps 96 to 101 is repeated, so that all check items through which the pen 1 has intersected are made to switch ON or OFF in a lump, or are maintained in the current state.

When counter i of the Switch is judged at step 102 to reach the number n of check items, at step 103, the pen trace 15 of FIG. 6(c) is eliminated as shown in FIG. 6(d), and the ON/OFF switching of the selected check items is completed in a lump.

In the method for controlling displayed contents according to the present embodiment, upon checking or unchecking check boxes of vertically continuous check items on the display screen, the operator only passes the pen 1 in the vertical direction on the display screen while keeping contact state thereto, so as to pass through the desired vertically continuous check items, whereby these desired vertically continuous check items can be selected. Thereafter, the operator only shifts the pen 1 to one direction of the transverse direction (the right direction in the explanation described above) on the display screen, to be capable of checking the above selected items in a lump, and the operator only shifts the pen 1 to the reverse direction (the left direction in the explanation described above) on the display screen, to be capable of unchecking the above selected items in a lump.

Therefore, in the method for controlling displayed contents according to the present embodiment, when the items to be checked or unchecked are vertically continuous, these continuous check items can be switched ON/OFF in a lump without individually switching each check box to ON/OFF state, so that the checking work to the check boxes can be performed efficiently.

FIGS. 9(a) to 9(c) show a radio button group 17 displayed by the projector 3 on the display screen 2a of the electronic whiteboard 2 in the electronic whiteboard system shown in FIG. 1, in which selective radio buttons 16 with respect to items 1 to 4 exist continuously in the vertical direction.

The method for controlling displayed contents according to the present embodiment will now be described with reference to FIGS. 9 and 10 with respect to the case of selecting to set ON the radio button of item 1 as shown in FIG. 9(a), and the case of unintentionally having selected the radio button of item 1 as shown in FIG. 9(b) even though the radio button of item 2 is desired to be selected to set ON as shown in FIG. 9(c).

When desiring to set ON the radio button of item 1 as shown in FIG. 9(a), an operator selects the corresponding radio button by making the pen 1 into contact with the display screen at a position of the item (item 1) and then detaches the pen 1 from the display screen to switch the radio button of the item 1 to ON.

When the operator makes incorrectly the pen 1 into contact with the display screen at the position of the item 1 to select the unintentional item as shown in FIG. 9(b), the operator only shifts the contact position from the unintentional item 1 to the correct item 2 as shown in FIG. 9(c) to cancel the unintentional selection of the item 1 and to reselect the intentional correct item 2. In this condition the operator detaches the pen 1 from the display screen to be capable of establishing the selection of the item 2 to set the corresponding radio button to ON.

FIG. 10 shows a control program in which the displayed contents processing part 43 in FIG. 1 executes the above-mentioned selection of the radio buttons. This program is started at step 111 when the pen 1 is pressed on the area in which the radio button group 17 shown in FIG. 9 is displayed.

At step 112, the radio button of the item existing at the pen position on the display screen in which the pen 1 is pressed is set True (ON), and at step 113, the radio buttons of items existing at positions other than the pen position are set False (OFF).

At step 114, it is judged whether the pen 1 is detached from the display screen or not, and if the pen 1 is judged to have been detached, the control is completed at once and only the radio button which has been finally selected at step 112 when the pen 1 has been detached is set True (ON).

While the pen 1 is in contact with the display screen, it is judged at step 115 whether or not the pen 1 is moved, and the judgment of step 115 is continuously executed until it is moved.

While the pen 1 is being moved, under such conditions that the pen 1 is judged at step 116 not to exceed the uppermost side of the radio buttons and also the pen 1 is judged at step 117 not to exceed the lowermost side of the radio buttons, the control is returned to steps 112 and 113 to set to True (ON) the radio button of the item existing at the pen position on the display screen in which the pen 1 is pressed and set to False (OFF) the radio buttons of items existing at positions other than the pen position.

If the pen 1 is judged at step 116 to have exceeded the uppermost side of the radio buttons, the radio button with respect to the uppermost item is set to True (ON) at step 118, and if the pen 1 is judged at step 117 to have exceeded the lowermost side of the radio buttons, the radio button with respect to the lowermost item is set to True (ON) at step 119.

After step 118 or 119 the control is returned to step 114 to repeat the above-mentioned loop until the pen 1 is judged at the step 114 to be detached from the display screen, and when the pen 1 is detached from the display screen, the program of FIG. 10 is completed.

In the method for controlling displayed contents according to the present embodiment, upon selecting by the pen 1 one of a plurality of selective radio buttons displayed on the display screen, even though one of these plurality of selective radio buttons has been selected by the pen 1, the operator only shifts the pen 1 with keeping contact on the display screen to be capable of alternatively selecting the radio button positioned on the shifted place, and then only detaches the pen 1 from the display screen to set finally to ON the selected radio button.

Therefore, when the radio button selected by the pen 1 is noticed to be wrong, a bothersome operation is eliminated in which the correct radio button has to be selected from the first once again after the pen 1 is once detached from the display screen.

Further, in the present embodiment, when the contact position of the pen 1 exceeds the uppermost side of the selective radio buttons, the uppermost radio button is selected, and when the contact position of the pen 1 exceeds the lowermost side of the selective radio buttons, the lowermost radio button is selected, for the above reason, even though the calling point exceeds the uppermost or lowermost side, selection of a button can be made reasonably and selective operation performance of the radio button can be improved.

FIG. 11(a) shows a scroll area 19 including a lot of menus 18 continuous in the vertical direction (illustrated, for convenience, as AAA . . . , BBB . . . , and the like) displayed by the projector 3 on the display screen 2a of the electronic whiteboard 2 in the electronic whiteboard system shown in FIG. 1.

The method for controlling displayed contents according to the present embodiment will now be described with reference to FIGS. 11 and 12 with respect to the case of selecting the menu of item G as shown in FIG. 11(d).

First of all, as shown in FIG. 11(a), an operator makes the pen 1 into contact with an arbitrary item (in the figure, item A) in a scroll area 19. In this state, when the pen 1 is shifted upwardly beyond an upper side of the scroll area 19, all of the items in the scroll area 19 can be scrolled downward, and when the pen 1 is shifted downwardly beyond a lower side of the scroll area 19, all of the items in the scroll area 19 can be scrolled upward.

It is conventional that an intended item can be displayed in the scroll area 19 and can be selected by such normal scrolling operation. In the present embodiment, however, the intended item can also be selected according to the following procedure.

First of all, as shown in FIG. 11(a) an arbitrary item (in the figure, item A) in a scroll area 19 is selected by making the pen 1 into contact with it, and subsequently, the pen 1 with keeping contact with the display screen is shifted outside of one of the transverse sides of the scroll area 19 as shown by arrow a in FIG. 11(b).

At this time, as shown in FIG. 11(b) the menu items in the scroll area 19 are displayed with reduction scale, preferably in such manner that all of the items appear in the scroll area 19, and also the item just lateral of the pen 1 is displayed with enlarged scale outside of the scroll area 19 and in contact with the corresponding transverse side thereof.

Subsequently, if the pen 1 with keeping in contact with an outer side of the scroll area 19 is moved up or down as shown by arrow β in FIG. 11(c), the selected and enlarged item 18a outside of the scroll area 19 is changed to the item just lateral of the pen 1, whereby the objective item G can be selected.

When the selected item 18a becomes the objective menu item G, the operator shifts the pen 1 into the scroll area 19 in the transverse direction as shown by arrow δ in FIG. 11(d). At this time the items in the scroll area 19 are displayed with the original enlarged scale while the objective menu item G is selected.

At this point, the operator may change his mind to select H, for example, by normal scrolling operation.

FIG. 12 shows a control program in which the displayed contents processing part 43 in FIG. 1 executes the selecting of a menu described above. This program is started at step 121 when the pen 1 is pressed on the scroll area 19 including the menu items 18.

At step 122 it is judged whether or not the pen 1 exceeds an upper side of the scroll area 19, and if the pen 1 exceeds it, at step 123 the entire items in the scroll area 19 are scrolled downwardly.

At step 124 it is judged whether or not the pen 1 exceeds a lower side of the scroll area 19, and if the pen 1 exceeds it, at step 125 the entire items in the scroll area 19 are scrolled upwardly.

However, if it is judged that the pen 1 exceeds none of the upper and lower sides of the scroll area 19 at steps 122 and 124, steps 123 and 125 will not be executed, so that the scroll operation described above will not be performed.

After such scroll control, at step 126, the item corresponding to the current coordinate of the pen 1 is selected, and subsequently, at step 127, it is judged whether or not the X coordinate of the pen 1 deviates from the range of the scroll area 19, that is, the pen 1 deviates from the transverse sides of the scroll area 19 as illustrated by arrow a in FIG. 11(b).

If the pen 1 deviates from the transverse sides of the scroll area 19, at step 128, the size of the item display font is reduced so that all of the items are displayed within the scroll area 19.

However, when the item display font becomes smaller than 2 points to make confirmation of items difficult, the size of the item display font is limited to be at least 2 points.

At step 129, it is judged whether or not the pen 1 has returned to the inside of the scroll area 19 as shown by arrow δ in FIG. 11(d), and if the pen 1 has returned, at step 130, the size of the item display font is set to the default value so that the menu items in the scroll area 19 is restituted to the original amplitude and displayed with enlarged scale.

At step 131, the judgment analogous to that of step 127 is performed, and if the pen 1 deviates from the transverse sides of the scroll area 19 as shown in FIGS. 11(b) and 11(c), then at step 132, the item selected at step 126 is displayed with enlarged scale outside of the scroll area 19 and in contact with the corresponding transverse side thereof.

At step 133, it is judged whether or not the pen 1 is detached from the display screen, and if the pen 1 is not detached, the control is returned to step 122 to repeat the loop described above until the pen 1 is detached from the display screen. When the pen 1 is detached from the display screen, the control in FIG. 12 is completed.

In the method for controlling displayed contents according to the present embodiment, upon selecting by the pen 1 one of the menus displayed continuously in the vertical direction on the display screen, when the pen 1 is deviated in the transverse direction from the scroll area 19 of the menus, the menus in the scroll area 19 are displayed with reduction scale in order to display as many menus as possible, and also, when the pen 1 is moved in the vertical direction while it exists at the deviated position in the transverse direction of the scroll area 19, one menu just lateral of the pen 1 is selected, and thereafter, when the pen 1 is made to get back within the scroll area 19, the menus in the scroll area is displayed with original enlarged scale, For the above reason, upon selecting a menu, the necessity of scrolling the menus upwardly or downwardly can be eliminated or, even if the menus have to be scrolled in the vertical direction until a desired menu item appears on the screen, the amount of scrolling can be reduced.

Accordingly, even if a number of menu items is large, the overshoot of scrolling can be prevented, thus, the selection of the menu items can be performed simply, surely, and in a short period of time.

What is claimed is:

1. A method for controlling displayed contents on a display device, upon checking or unchecking in check boxes which are continuously arranged together with their check items in the vertical direction, characterized in that, when a calling point is made to pass in the vertical direction on a display screen in order to pass through desired, continuous check items of said check items, these desired, continuous check items are selected, and subsequently when the calling point is further shifted in one direction of the transverse direction on the display screen, the selected items are checked, and when the calling point is shifted in the other direction of the transverse direction on the display screen, the selected items are unchecked.

2. A method for controlling displayed contents on a display device, upon selecting one of menus continuous in the vertical direction on a display screen by a calling point, characterized in that, when the calling point is deviated in the transverse direction from a scroll area of said menus, the menus in the scroll area are displayed with reduction scale in order to increase the number of displayed menus, and in this condition, when the calling point is shifted in the vertical direction, one of the menus in the scroll area which stand in row with the calling point is selected, and thereafter, when the calling point is made to get back within said scroll area, the menus in the scroll area is displayed with original scale so as to display said selected menu in the scroll area.

* * * * *